United States Patent
Hall (10) Patent No.: US 7,120,004 B2
(45) Date of Patent: Oct. 10, 2006

(54) CURRENT DIVERTER STRIP AND METHODS

(76) Inventor: Allen L. Hall, 33 Stratton Rd., Williamstown, MA (US) 01267

( * ) Notice: Subject to any disclaimer, the term of this patent is extended or adjusted under 35 U.S.C. 154(b) by 63 days.

(21) Appl. No.: 10/919,860

(22) Filed: Aug. 17, 2004

(65) Prior Publication Data

US 2005/0041362 A1    Feb. 24, 2005

Related U.S. Application Data

(60) Provisional application No. 60/496,347, filed on Aug. 18, 2003.

(51) Int. Cl.
*H05F 3/00*    (2006.01)

(52) U.S. Cl. ................................. 361/218
(58) Field of Classification Search ............... 361/218
See application file for complete search history.

(56) References Cited

U.S. PATENT DOCUMENTS

| | | | |
|---|---|---|---|
| 3,416,027 A | 12/1968 | Amason et al. | 315/36 |
| 4,237,514 A | 12/1980 | Cline | 361/117 |
| 4,429,341 A * | 1/1984 | King | 361/117 |
| 4,445,161 A | 4/1984 | Brick | 361/218 |
| 4,506,311 A | 3/1985 | Cline | 361/218 |
| 4,583,702 A | 4/1986 | Baldwin | 244/1 A |
| 4,796,153 A * | 1/1989 | Amason et al. | 361/218 |
| 5,841,066 A | 11/1998 | Bocherens | 174/2 |

FOREIGN PATENT DOCUMENTS

| WO | WO 2005/071262 A1 | 8/2005 |
|---|---|---|
| WO | WO 2005/071788 A2 | 8/2005 |

OTHER PUBLICATIONS

Aircraft Applications of Segmented-Strip Lightning Protection Systems; M.P. Amason et al; Apr. 14-17, 1975; pp. 1-15.
Military Specification; MIL-I-83456 (USAF); Dec. 20, 1974; pp. 1-20.

* cited by examiner

*Primary Examiner*—Ronald Leja
(74) *Attorney, Agent, or Firm*—David J. Rikkers; Foley & Lardner LLP (57) ABSTRACT

A current diverter strip is provided having a dielectric (22) located above a plurality of conductive segments (24). An insulator (30) is also provided among said conductive segments (24) and below said dielectric (22). When RF transparency is required, the conductive segments (24) can have a maximum dimension that is approximately ⅙th of a wavelength of the highest operating frequency of an antenna that may be communicating through the current diverter strip. The dielectric (22) may be colored to match the color of the structure to which it is implemented. Upon exposure to a strong electric field, the current diverter strip (20) forms an ionized channel above the dielectric (22). In various implementations, the current diverter strip may be radio frequency transparent, environmentally and chemically resistant, color matched to its surroundings, and/or can withstand repeated uses.

38 Claims, 10 Drawing Sheets

CURRENT DIVERTER STRIP AND METHODS

CROSS-REFERENCE TO RELATED APPLICATIONS

This Patent Application claims priority to U.S. Provisional Patent Application No. 60/496,347, filed on Aug. 18, 2003, the contents of which are incorporated herein by reference in its entirety.

FIELD OF THE INVENTION

This invention relates generally to the diversion of current and more specifically to the creation of an ionized path to divert current.

BACKGROUND

Arcing current, such as a lightning strike, can attach to conductive objects near or contained within non-conductive enclosures. For example, lightning has penetrated nose radomes on aircraft and forced lightning currents in excess of 200,000 amperes into the antennas and other sensitive electronics underneath the nose radomes. Such lightning strikes cause considerable degradation of the radome structure and extensive damage to the underlying antenna and sensitive electronics.

Lightning diverter strips have been devised in the past to prevent lightning puncture of radomes. These lightning diverter strips provide an alternate electrically conductive path for the lightning current. Typically, the lightning diverter strip is applied over the outer surface of the radome with one end of each lightning diverter strip electrically grounded to the conductive airplane structure.

There are three main forms of lightning diverter strips. One form is the continuous metal conductor, which includes metal bars and foils. Another form is the segmented diverter strip which is comprised of closely spaced metal segments that have been applied to a flexible strip material. The third form of lightning diverter strip applies finely powdered aluminum to a non-conductive substrate using a flexible epoxy such that the strip will have a very high DC resistance but will conduct lightning current.

The three main conventional diverter strip forms have one or more of the following disadvantages. The lightning diverter strip may have a detrimental impact on the underlying antenna's radio frequency performance. The lightning diverter strip may be damaged during a lightning strike, thereby reducing its lightning strike diversion ability for subsequent lightning strikes. The lightning diverter strip may be susceptible to weather erosion which reduces the lightning diversion effectiveness of the strip, or the lightning diverter strip may be visible on the radome surface which detracts from the aesthetics of the radome.

SUMMARY OF THE INVENTION

According to an example of the invention, a current diverter strip is configured to initiate an ionized channel in the presence of an electric field, to redirect lightning current away from sensitive equipment. The invention may have a minimal impact on the radio frequency performance of any underlying antennas, may be capable of diverting multiple lightning strikes, may be weather and chemical resistant, may be visually appealing, including colorable, and/or may be readily applied to radomes, aerospace vehicles or other structures.

According to an implementation of the invention, a thin dielectric has closely spaced conductive segments aligned longitudinally on the underside of the dielectric. The underside of the dielectric and conductive segments are covered with an insulator, such as an adhesive. The assembled diverter strip is able to be applied to the outer surface of an aircraft radome, or the like, such as by the unused face of the adhesive. The end of the diverter strip, near the base of the radome, can be grounded to the aircraft with a bolt, strap, hinge, or other suitable conductive element. In the presence of an electric field associated with lightning, an ionized channel may be formed over the exposed face of the current diverter strip. The ionized channel can redirect the lightning current over the radome and to the conductive element, thereby inhibiting puncture of the radome and damage to the underlying antenna and sensitive electronics.

BRIEF DESCRIPTION OF THE FIGURES

The invention will be apparent from the description herein and the accompanying drawings, in which like reference characters refer to the same parts throughout the different views.

DETAILED DESCRIPTION

The present invention can be used to divert current by providing an ionized path to guide the current, and can be used in a wide variety of applications. Examples include use on an aircraft, a wind turbine, electrical transmission equipment and other applications involving potential exposure to undesirable current. When exposed to electric fields, such as electric fields associated with lightning, the current diverter strip of the invention can form an ionized channel in an area near the diverter strip that conducts the undesirable current from the item protected by the current diverter strip. Undesirable current can be current of an undesirably high amperage. Often, undesirable current also results in associated undesirable, excessive voltages. Other embodiments can be used to shunt undesirable voltages and currents, such as those that may be present on electrical conductors, from sensitive electrical or electronic equipment.

Figure 1:
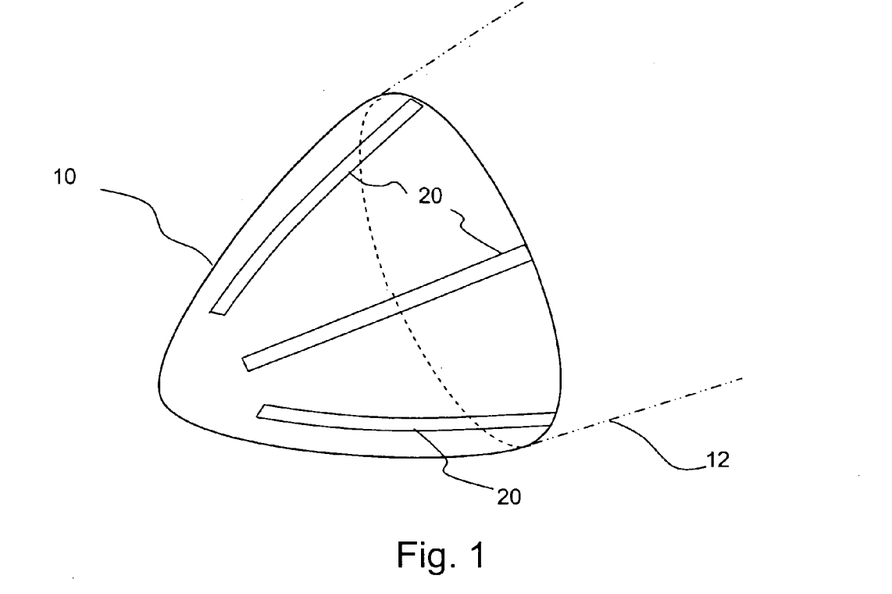
FIG. 1 is a perspective view of an aircraft nose radome with an illustrative embodiment of the invention.
Figure 2:
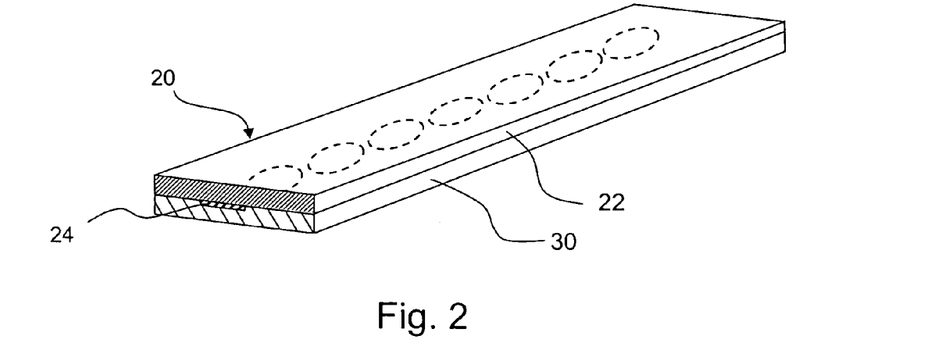
FIG. 2 is a perspective, cross-sectional view of the current diverter strip of FIG. 1.

One example implementation of the invention involves the placement of a current diverter strip on an aircraft. FIG. 1 is an illustration of current diverter strips 20, used as lightning diverter strips, that might be used on a radome 10 of an aircraft 12. The radome 10 may be mounted on the forward-most portion of the fuselage of the aircraft 12 and houses sensitive electronic equipment, such as weather radar, or the like. Because of its location at a high electric field gradient point of the aircraft, the radome 10 is particularly susceptible to being a site of "attachment" for lightning strikes when flying in inclement weather. Such lightning strikes can penetrate the radome and damage the radome and the sensitive equipment enclosed therein. To minimize or prevent this damage, one or more current diverter strips 20 can be installed on the surface of the radome 10, as is shown in FIG. 1. The current diverter strips 20 are spaced apart on the external surface of the radome 10 and are electrically connected to the aircraft 12.

An embodiment of the current diverter strip 20, as illustrated by way of example in FIG. 1 through FIG. 4, includes a relatively thin, flexible dielectric 22 with closely spaced conductive segments 24 applied to the lower surface of the dielectric 22. An insulator 30 is applied along the lower surfaces of the dielectric 22 and conductive segments 24. As used herein, "upper" refers to the surface of the current diverter strip 20 that is exposed when mounted on a surface, such as a surface of the radome 10, and "lower" refers to the surface of the current diverter strip 20 that is nearest to the surface on which the lightning diverter strip is configured to be mounted, such as a radome.

The dielectric 22 is a material which can provide an environmentally and chemically resistant barrier over the conductive segments 24. The dielectric 22 is also thin enough and has an adequate dielectric strength to allow the creation of an ionized channel over the upper surface of the dielectric 22. If used in an aerospace application, a dielectric of suitable strength can be selected to withstand the conditions experienced in aerospace environments. Optionally, the dielectric can be selected to be colorable.

Examples of materials that can be used to form the dielectric 22 include, but are not limited to, fluoropolymer films such as ethylene-chlorotrifluoroethylene (ECTFE). Fluoropolymer films have been used on high speed aircraft as a replacement for paint and have demonstrated environmental and chemical resistance equivalent to or better than paint. An example of an acceptable fluoropolymer film is the part number 5004 from 3M of St. Paul, Minn. In one implementation, good results in tests involving 200,000 Amps have been obtained using a 0.003 inch thick RF glow discharge modified HALAR® film, available from Integument of Tonawanda, N.Y. Fluoropolymer films can also optionally be colored to match the color of the surrounding item surface, such as that of a radome. The dielectric 22 may be formed of other materials which allow the creation of an ionized channel over the material. Examples of non-fluoropolymer films include SCOTCH® Magic™ 810 tape and part number 8671 polyurethane tape, available from 3M Corporation of St. Paul, Minn., and 0.002 inch thick polyester film, part number G10259, available from Mactac of Stow, Ohio.

The conductive segments 24 are formed of materials having an area resistivity less than 0.5 Megohms per square. One example includes resistivity of 1 to 5 kilohms per square. Good results in tests involving 200,000 Amps have been achieved with the conductive segments 24 having a resistivity of approximately 2 kilohms per square. Optionally, neighboring conductive segments may have different resistivities. It is understood that the resitivities may vary among the conductive segments randomly or in an organized pattern.

Conductive segments 24 may be provided by silk screening a conductive ink on the dielectric 22. Examples of conductive inks are part numbers 804-06 and 804-07 available from Noelle Industries of Billerica, Mass. and part number 15067 available from Permatex, Inc. of Hartford, Conn. Examples of alternatives for applying the conductive ink to the dielectric 22 include stamping, etching, painting, or printing.

A further alternative of forming the conductive segments 24 is chemically etching a layer of copper that has been deposited on the lower side of the dielectric 22, in a manner similar to that used to manufacture printed circuit boards. Another alternative of forming the conductive segments 24 is by applying a conductive paint or adhesive, with an area resistivity less than 0.5 Megohms per square, to the dielectric 22. Further alternatives include the use of carbon and/or graphite. Examples of methods of applying the carbon and/or graphite include drawing, spraying, or printing. Examples of carbon/graphite materials are part number HP6614d ink jet ink available from Hewlett-Packard of Palo Alto, Calif. and 0.5 mm HB high polymer pencil lead from Pentel of America, Ltd. of Torrance, Calif.

Another example of conductive segments 24 involves the use of one or more conductive fibers. Examples of conductive fiber include carbon fiber, metal plated carbon fiber, and metal plated non-conductive fiber such as metal plated fiberglass. The fibers may be oriented in substantially the same direction and be woven or bound, such as by a non-conductive binder. One example of a conductive segment is a carbon fiber tow having 3,000 to 12,000 fibers. In such a case, the conductive segment may be approximately 1 inch long by ⅛ inch *wide*. *It* is understood that other amounts and dimensions of conductive fibers may also be used within the scope of the *invention*.

The dielectric strength of the dielectric 22 should be selected to be adequate to inhibit or prevent high voltage puncture of the dielectric. Examples of thicknesses of the dielectric can include, but are not limited to, 0.0005 to 0.005 inches and/or 0.005 to 1.0 inches. For lower resistivity conductive segments 24, such as when the conductive segments are made of copper, the dielectric strength should be higher than when the conductive segments are made of a higher resistivity material such as carbon. The dielectric strength of a dielectric material generally increases with the thickness of the dielectric. Thus, for a specific dielectric material, the dielectric used with lower resistivity conductive segments should generally be thicker than the dielectric material used with higher resistivity conductive segments.

The conductive segments 24, when located on the dielectric 22, are electrically separated from one another. The minimum spacing between the conductive segments 24, denoted by the letter "X" in FIG. 4, need not be uniform and can vary along the length of the diverter strip. Examples of spacing of the conductive segments include, but are not limited to, 0.0005 to 0.020 and/or 0.020 to 1.0 inches. Good results in tests involving 200,000 Amps have been obtained with spacing between the conductive segments between 0.002 inches and 0.020 inches.

The size of the conductive segments 24 may vary. Each conductive segment may have a maximum dimension, as illustrated by the letter "Y" in FIG. 4. For current diverter strips requiring RF transparency, such as current diverter strips used on an aircraft nose radome, the maximum dimension of the conductive segments is approximately one-sixth or less of the wavelength of the highest operating frequency of the underlying antenna. For example, if the underlying antenna is a type of commonly used weather radar, operating at a frequency of 9.375 gigahertz, the wavelength is approximately 0.126 inches. In this example, the maximum dimension of the conductive segment is approximately 0.21 inches. Smaller conductive segments 24 may be preferred in instances where the current diverter strip is used with an aircraft weather radar having very high frequencies, since the current diverter strip with smaller conductive segments will tend to be more transparent to such high frequencies. Examples of the maximum dimension for the conductive segments for current diverter strips not requiring RF transparency include, but are not limited to, 0.0005 to 0.25 and/or 0.25 to 12 inches.

The conductive segments 24 may be round in shape. Many other shapes, such as rectangles, squares, ovals, trapezoids, triangles, etc. could be chosen and/or be used in combination.

Figure 3:
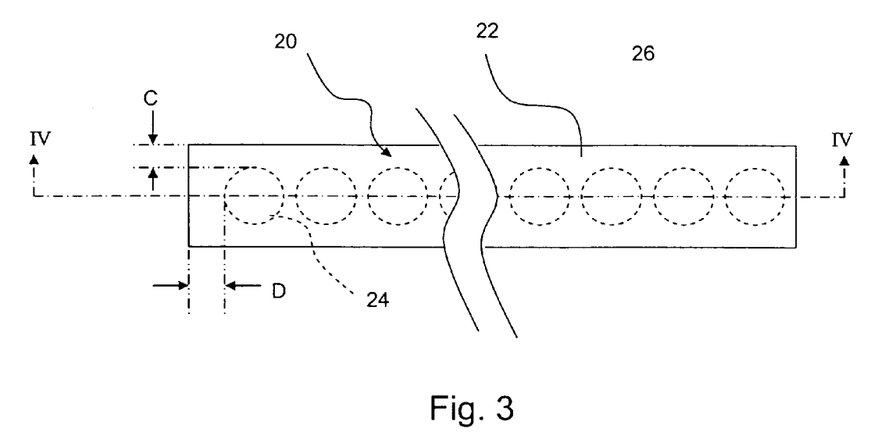
FIG. 3 is a top view of the current diverter strip of FIG. 2.
Figure 4:
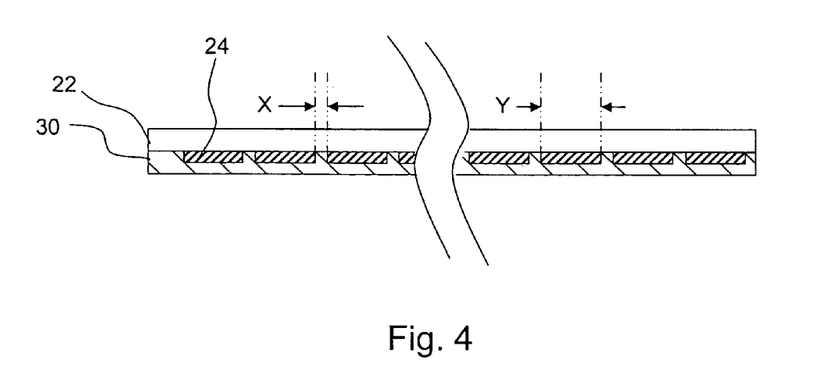
FIG. 4 is a side, cross-sectional view of the current diverter strip of FIG. 3.

The distances between an edge of a conductive segment 24 and the perimeter edge of the dielectric 22 and insulator 30, as illustrated by the letters "C" and "D" in FIG. 3, are such that an ionized channel is constrained to the upper surface of the dielectric 22. Examples of the distance between an edge of a conductive segment and the perimeter edge of the dielectric can include, but are not limited to, 0.001 to 0.1 and/or 0.1 to 12 inches. Good results in tests involving 200,000 Amps have been obtained when the dimension between an edge of a conductive segment and the perimeter edge of the dielectric is greater than 0.3 inches.

An insulator 30 may be applied to the lower side of the dielectric 22. The insulator 30 also covers the exposed surfaces of the conductive segments 24 on the lower side of the dielectric 22. The insulator 30 may be an adhesive, such as a pressure-sensitive acrylic adhesive, which has demonstrated good results in aircraft environments. Other adhesives such as epoxies or pressure-sensitive silicones, may be used. Other examples of insulators include fluoropolymers, polyesters, and polyimides. If a non-fluid insulator is used, a structural configuration may also be provided to keep the insulator proximate to the conductive segments 24 and dielectric 22 and inhibit air pockets between the conductive segments 24. By minimizing air pockets between the conductive segments 24 and between the conductive segments 24 and the dielectric 22, performance can be enhanced by minimizing the potential for damage that could be caused by current arcing between the conductive segments 24.

The positioning of the current diverter strip to protect a radome may be similar to that for conventional lightning diverter strip positioning. The adhesive 30 on the diverter strip may be used to adhesively bond the current diverter strip 20 to the radome. The relative placement and the number of diverter strips are such that the entire radome may be protected from approaching lightning. One end of each of the current diverter strips 20 is grounded by forming an electrically-conductive coupling to a location to receive the diverted current. In the case of an aircraft radome, grounding may be done at the base of the radome 10 to the aircraft 12 by a fastener, such as a bolt, a screw, a strap and/or a hinge.

According to an implementation of the invention, in the presence of a strong electrical field, such as that associated with lightning, the air over the current diverter strip 20 ionizes. The process for creating the ionized channel may begin when an electric field is applied to the current diverter strip. This may often be an electric field that is increasing, decreasing or varying in strength over time and/or along the length of the current diverter strip 20. The conductive segments 24 may intensify the electric field in the region near the gaps between the conductive segments. Regions of opposing electrical charge may accumulate on the outer surface of the dielectric 22, near the gaps between the conductive segments 24, in response to the strong electric field. When the electric field reaches a threshold, the oppositely-charged regions on the outer surface of the dielectric may create multiple electrical discharges. The one or more electrical discharges over the dielectric can form an ionized channel over the dielectric. Subsequent electrical discharges and resultant ionized channels may occur if the electric field continues to increase.

The threshold of the electric field required to initiate the ionized channel can be a function of the resistivity of the conductive segments 24, the sizes, shapes, and spacing of the conductive segments 24, the thickness and electrical properties of the dielectric 22, the electrical properties of the insulator 30, and the length of the current diverter strip. For example, a current diverter strip with high resistivity conductive segments 24 can require a larger electric field strength to establish an ionized channel than low resistivity conductive segments. Also, current diverter strips with thick dielectrics 22 can require higher electrical field strengths to establish an ionized channel than current diverter strips with thin dielectrics.

The ionized channel can provide a conductive path for undesirable current over the dielectric 22 and to the location of electrically-conductive coupling to the desired current diversion location. The undesirable current, such as that associated with a lightning strike, can thereby be diverted across the external surface along which the current diverter strip is located, such as a surface of a radome. The undesirable current is thereby inhibited from puncturing the surface. The lightning strike is therefore also inhibited from damaging the antenna and sensitive electronics beneath the surface of the radome. Upon completion of the lightning strike process, the air in the vicinity of the current diverter strip returns to the non-ionized state until another electric field is created, such as those created in conjunction with lightning. Since the undesirable currents caused by a lightning strike are conducted above, and not through, the current diverter strip 20, the current diverter strip remains substantially unaffected.

Figure 5:
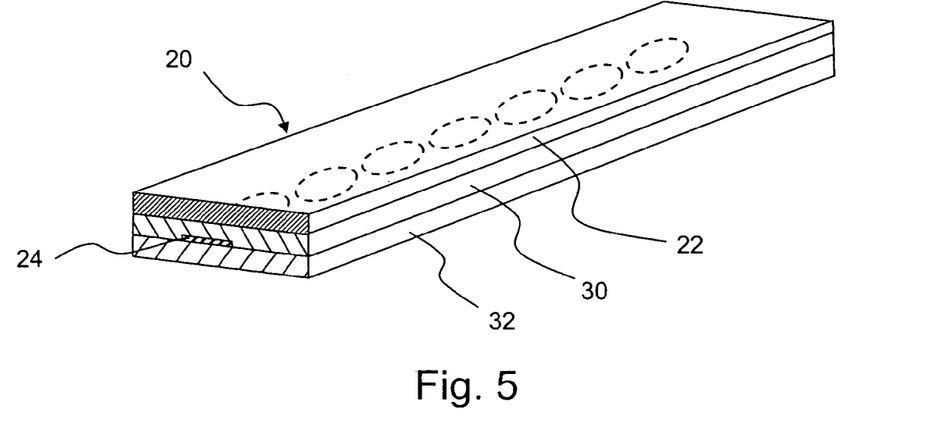
FIG. 5 is a perspective, cross-sectional view of an alternative embodiment of a current diverter strip.
Figure 6:
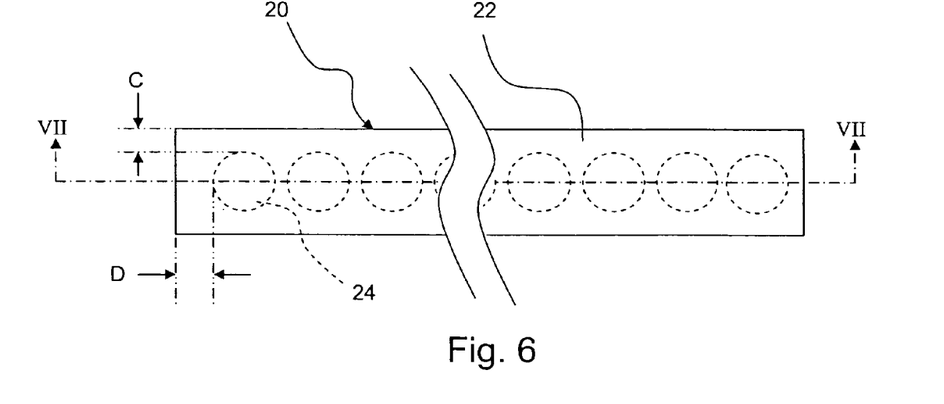
FIG. 6 is a top view of the current diverter strip of FIG. 5.
Figure 7:
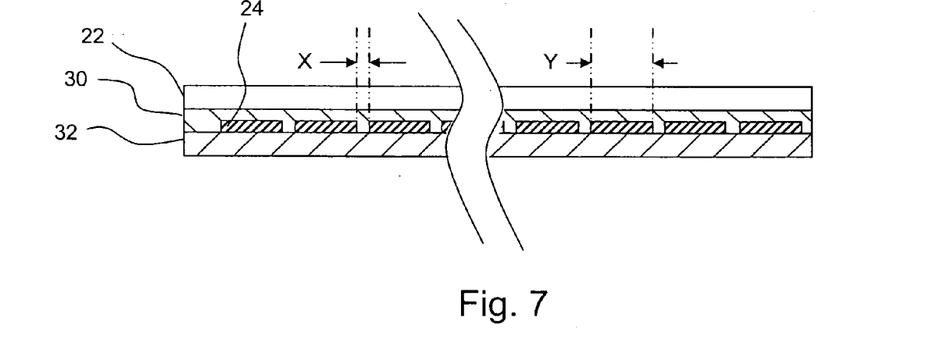
FIG. 7 is a side, cross-sectional view of the current diverter strip of FIG. 6.

As illustrated by way of example in FIGS. 5, 6, and 7, an alternative embodiment of a current diverter strip 20 includes a relatively thin, flexible non-conductive substrate 32, such as a strip of woven glass fibers filled with a suitable epoxy material. Conductive segments 24 are formed on the substrate 32. An insulator 30 is applied over the conductive segments 24 and the upper side of the substrate 32. The lower side of the dielectric 22 is applied to the upper side of the insulator 30 thereby sandwiching the insulator 30 between the dielectric 22 above and the conductive segments 24 and substrate 32 below.

Several current diverter strips 20 may be adhesively bonded to the outer surface of a structure, such as a radome. The relative placement and the number of diverter strips are such that the entire structure may be protected from undesirable currents. One end of each of the current diverter strips 20 is grounded by forming an electrically-conductive coupling to a location to receive the diverted current. In an electric field, such as that associated with a lightning, an ionized channel is formed over the upper surface of the dielectric 22, and creates a conductive channel to divert the undesirable current away from the structure, such as a radome with underlying antennas and sensitive electronics.

Various embodiments of the invention may be used to protect aerospace vehicles, examples of which may include aircraft, helicopters, airships, balloons, or rockets, which use composite structures. Although a composite structure can provide weight and cost benefits, composite structures typically experience more damage from lightning strikes than metal structures.

Figure 8:
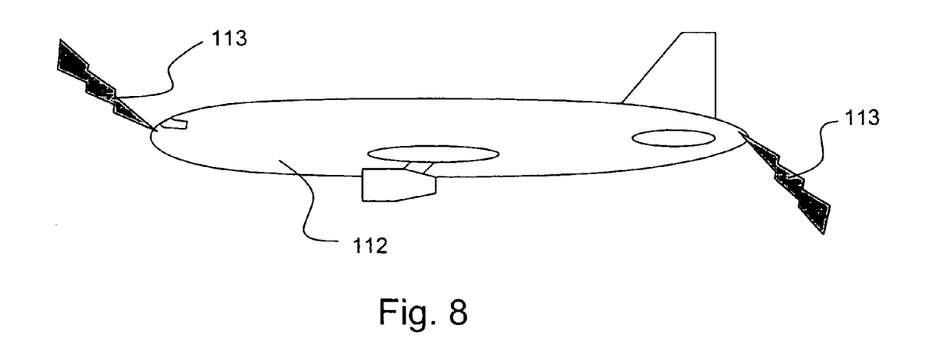
FIG. 8 illustrates an initial lightning attachment point of a stationary lightning strike along a moving aircraft.
Figure 9:
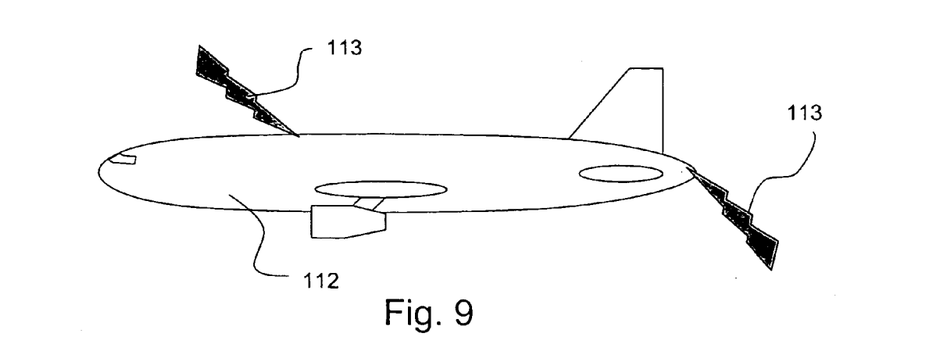
FIG. 9 illustrates a subsequent reattachment point of a stationary lightning strike along a moving aircraft.

One aspect in the minimization of lightning damage is the mechanism by which lightning attaches to an aircraft. When a lightning strike occurs to an aircraft, the lightning channel remains stationary while the aircraft travels forward. This relative motion between the lightning channel and the aircraft forces the lightning channel to reattach multiple times along the aircraft. Thus, a lightning strike may result in several damage locations along the aircraft due to this reattachment process. A pictorial example of this reattachment process is shown in FIG. 8 and FIG. 9. FIG. 8 shows the lightning initial attachment of the lightning channel 113 to the nose and tail of the aircraft 112. FIG. 9 illustrates the lightning channel reattaching further aft along the fuselage due to the relative movement of the aircraft with the lightning channel.

Figure 10:
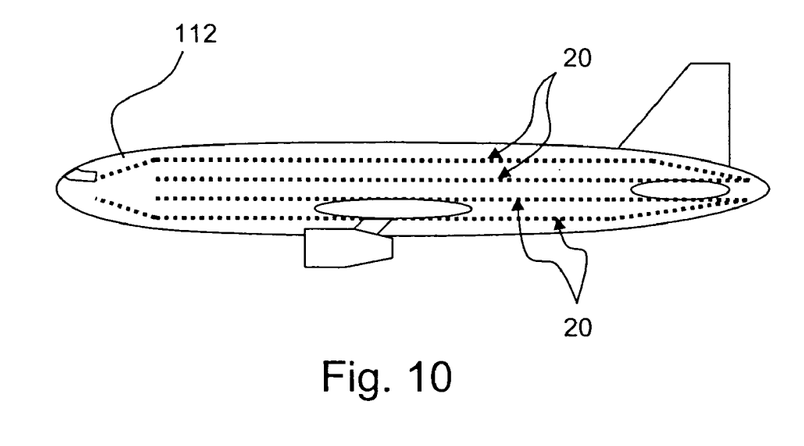
FIG. 10 is a side view of an aircraft having multiple current diverter strips.

By using a current diverter strip 20, the lightning channel 113 could be diverted over long spans of the composite aircraft 112 such that the lightning damage to the aircraft would be greatly reduced. One or more of the current diverter strips 20 could be built into the structure of the aircraft, as shown in FIG. 10.

Figure 11:
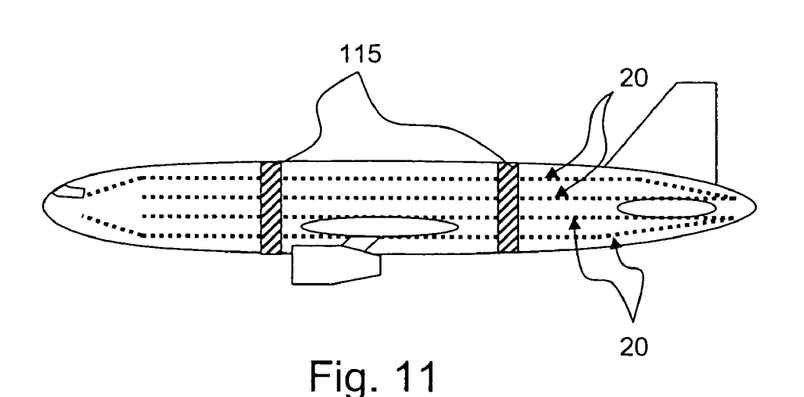
FIG. 11 is a side view of an aircraft having multiple current diverter strips and multiple termination portions.

Optionally, the current diverter strip may be terminated and grounded at regular intervals to conductive aircraft structure 115 that is tolerant of the lightning current, such as a reinforced structural area or an area with added conductivity. This may be done to aid in manufacturing. An example of this configuration is shown in FIG. 11.

Figure 12:
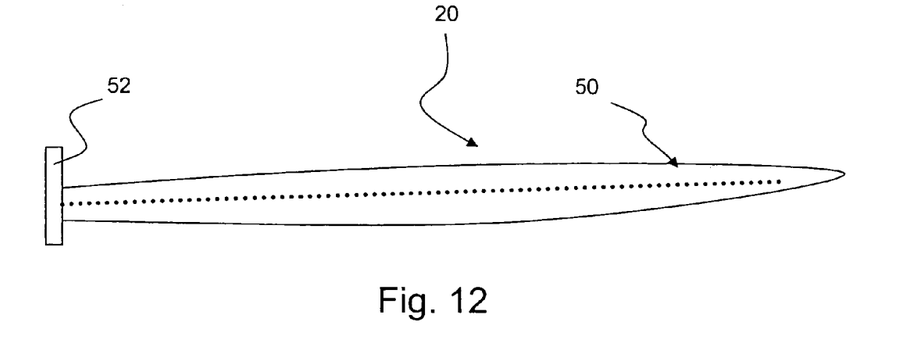
FIG. 12 illustrates a current diverter strip located on a blade of a wind turbine according to a further implementation of the invention.

The invention may be used with a blade 50 of a wind turbine, as illustrated by way of example in FIG. 12. One or more current diverter strips 20 may be provided on the blade 50. The current diverter strip 20 may be in communication with a conductive blade base 52 to provide a ground for the current diverter strip 20. It is understood that the current diverter strip 20 need not extend the full length of the blade 50 and may be formed according to a wide variety of variations.

Figure 13:
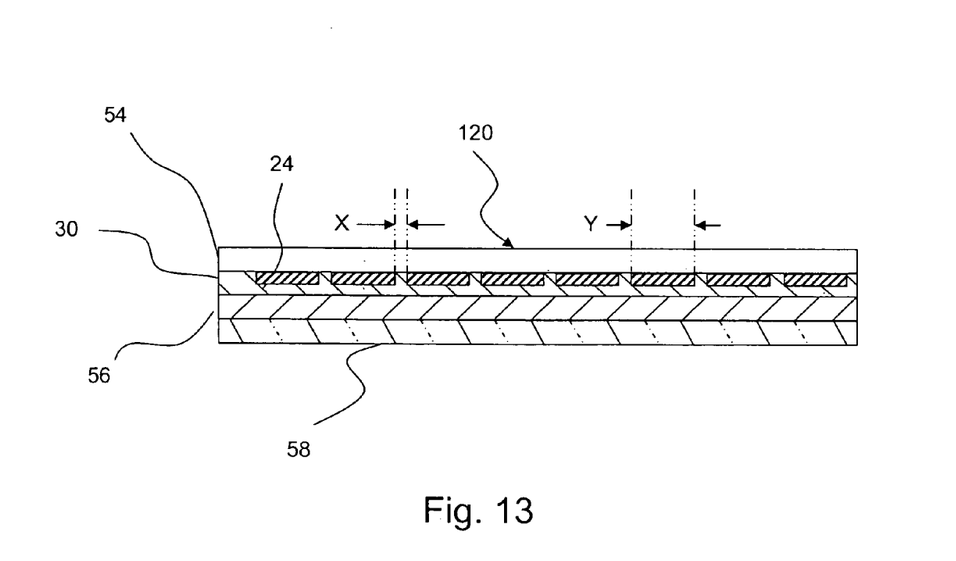
FIG. 13 is a side, cross-sectional view an integral current diverter strip according to another embodiment of the invention.

A further embodiment of the invention can provide for the incorporation of the current diverter strip 20 within the object being protected from undesirable current. An example of an integral current diverter strip 120 is illustrated in FIG. 13. By incorporating the integral current diverter strip 120 in the object, it may be possible to achieve benefits in improved aerodynamic and aesthetic properties over the use of an external current diverter strip.

As illustrated in FIG. 13, the integral current diverter strip 120 is similar in construction to the current diverter strip 20, except that a non-conductive outer surface 54 of the object is used as the dielectric. Conductive segments 24 are provided along an insulator 30. In objects having an insufficient amount of a non-conductive structure near the outer surface, another layer of non-conductive structure 56 may optionally be provided under the insulator 30. Alternatively or in addition, the insulator 30 may be provided in a sufficient thickness to inhibit the arcing current from reaching any underlying structure 58. The underlying structure 58 may be conductive or non-conductive.

Figure 14:
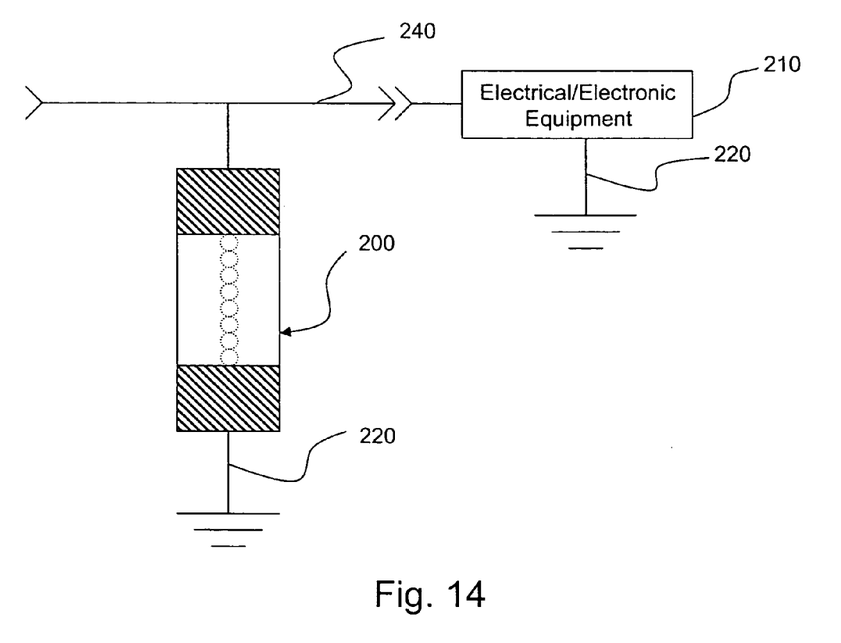
FIG. 14 is a schematic of a transient voltage current diverter strip according to another embodiment of the invention.
Figure 15:
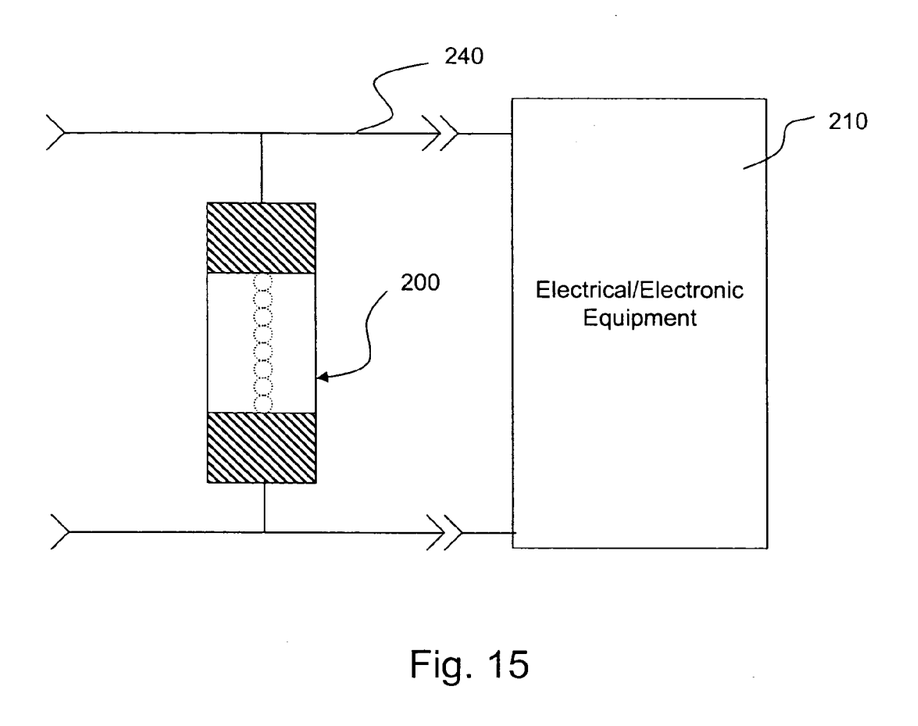
FIG. 15 is a schematic of an alternative arrangement for a transient voltage current diverter strip.

The current diverter strip 20 may also be used to suppress undesirable voltage and current transients to electrical or electronic equipment and the like. An example of a transient voltage suppressor current diverter strip 200 is shown in FIG. 14 and FIG. 15. As illustrated in FIG. 14, the transient voltage suppressor current diverter strip can be installed between an electrical conductor 240, such as an electrical wire from a power source, and an electrical ground 220 to prevent the transmission of undesirable voltages and currents from propagating into sensitive electrical/electronic equipment 210. As illustrated in FIG. 15, the transient voltage suppressor diverter strip can also be installed between two electrical conductors 240 to suppress undesirable voltage differentials between the electrical wires prior to the undesirable voltages reaching the sensitive electrical/electronic equipment 210.

Figure 16:
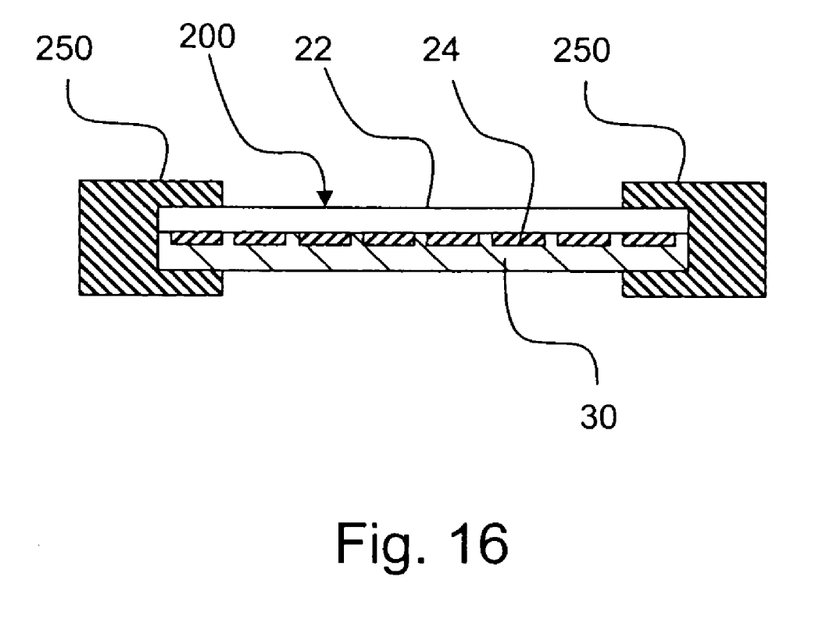
FIG. 16 is a side, cross-sectional view of the transient voltage current diverter of FIGS. 14 and 15.

FIG. 16 illustrates a cross section of an example of the transient voltage suppressor current diverter strip. Conductive segments 24 are sandwiched between a dielectric 22 and an insulator 30 in a manner similar in construction to the current diverter strip 20. Conductive electrodes 250 are fitted on the longitudinal ends of the transient voltage suppressor current strip such that undesirable current may flash across the exposed face of the dielectric 22, between the electrodes. The conductive electrodes may be made of a conductive metal, such as stainless steel, that is capable of withstanding the high temperatures associated with arcing current. The conductive electrodes would also allow electrical connections to electrical wiring and the like.

The operation of the transient voltage suppressor current diverter strip 200 could allow for the normal use of the electrical equipment until an undesirable voltage transient appeared on the electrical conductor(s) to which the transient voltage suppressor current diverter strip is attached. When the undesirable voltage transient reaches the transient voltage suppressor current diverter strip, an ionized path is created above the dielectric. The ionized path shunts the undesirable voltage, and its associated undesirable current, to ground as illustrated in FIG. 14 or equalizes the differential voltage between electrical conductors, as illustrated in FIG. 15. Thus the undesirable voltage transient, with its associated undesirable current, does not reach the sensitive electrical/electronic equipment 210.

It is understood that the various embodiments, examples and implementations disclosed herein may be implemented in a wide range of applications. For example, the integral current diverter strip 120 may be used with a power supply infrastructure, aerospace vehicle, radome, wind turbine blade or other objects that could be protected from arcing current, including lightning or static electricity or other such discharges. The transient voltage suppressor current diverter strip 200 may be used with electrical and electronic equipment, power distribution systems, or telephone systems that could be protected from voltage and current transients conducted through electrical conductors.

The present invention has been described by way of example, and modifications and variations of the exemplary embodiments will suggest themselves to skilled artisans in this field without departing from the spirit of the invention. Features and characteristics of the above-described embodiments may be used in combination. The preferred embodiments are merely illustrative and should not be considered restrictive in any way. The scope of the invention is to be measured by the appended claims, rather than the preceding description, and all variations and equivalents that fall within the range of the claims are intended to be embraced therein.

What is claimed is:

1. A current diverter strip adapted to create an ionized path to guide a current, comprising:
    a plurality of conductive segments separated by reduced-conductivity gaps, said reduced-conductivity gaps adapted to ionize air along said path upon application of an electric field associated with said current; and
    a dielectric located along a surface of said plurality of conductive segments, adapted to inhibit said current from traveling through and between said plurality of conductive segments during creation and duration of said ionized path.

2. The current diverter strip of claim 1 wherein said conductive segments have a maximum dimension less than ⅙th the highest operating frequency of an associated antenna.

3. The current diverter strip of claim 1 wherein said conductive segments are formed from a conductive ink with an area resistivity less than 0.5 Megohms per square.

4. The current diverter strip of claim 1 wherein said conductive segments are formed by chemically etching a metal that has been applied to said dielectric.

5. The current diverter strip of claim 1 wherein said conductive segments are formed from a conductive epoxy with an area resistivity less than 0.5 Megohms per square.

6. The current diverter strip of claim 1 wherein said conductive segments are formed by electrically conductive fibers.

7. The current diverter strip of claim 1 wherein said dielectric is of a color that visually approximates the color of the surface where said current diverter strip is installed.

8. The current diverter strip of claim 1 wherein said dielectric is a fluoropolymer.

9. The current diverter strip of claim 1 wherein said dielectric is a fiberglass laminate impregnated with an epoxy resin.

10. A current diverter strip including a plurality of conductive segments arranged longitudinally and sandwiched between a dielectric and an adhesive, said plurality of conductive segments, said adhesive and said dielectric arranged to inhibit a current from traveling through and between said plurality of conductive segments when an ionized path is being created and existing and located on an outer surface of said dielectric.

11. The current diverter strip of claim 10 wherein said conductive segments have a maximum dimension less than ⅙th the highest operating frequency of an associated antenna.

12. The current diverter strip of claim 10 wherein said conductive segments are formed from a conductive ink with an area resistivity less than 0.5 Megohms per square.

13. The current diverter strip of claim 10 wherein said conductive segments are formed by chemically etching a metal that has been applied to said dielectric.

14. The current diverter strip of claim 10 wherein said conductive segments are formed from a conductive epoxy with an area resistivity less than 0.5 Megohms per square.

15. The current diverter strip of claim 10 wherein said conductive segments are formed by electrically conductive fibers.

16. The current diverter strip of claim 10 wherein said dielectric is of a color that visually approximates the color of the surface where said current diverter strip is installed.

17. The current diverter strip of claim 10 wherein said dielectric is a fluoropolymer.

18. The current diverter strip of claim 10 wherein said dielectric is a fiberglass laminate impregnated with an epoxy resin.

19. A current diverter strip, comprising:
    a plurality of conductive segments formed longitudinally on a non-conductive substrate and;
    a dielectric and;
    an adhesive sandwiched between said dielectric and said non-conductive substrate with said conductive segments;
    said plurality of conductive segments, said adhesive and said non-conductive substrate arranged to inhibit a current from traveling through and between said plurality of conductive segments during creation and existence of an ionized path along said current diverter strip.

20. The current diverter strip of claim 19 wherein said conductive segments have a maximum dimension less than ⅙th the highest operating frequency of an associated antenna.

21. The current diverter strip of claim 19 wherein said conductive segments are formed from a conductive ink with an area resistivity less than 0.5 Megohms per square.

22. The current diverter strip of claim 19 wherein said conductive segments are formed by chemically etching a metal that has been applied to said dielectric.

23. The current diverter strip of claim 19 wherein said conductive segments are formed from a conductive epoxy with an area resistivity less than 0.5 Megohms per square.

24. The current diverter strip of claim 19 wherein said conductive segments are formed by electrically conductive fibers.

25. The current diverter strip of claim 19 wherein said dielectric is of a color that visually approximates the color of the surface where said current diverter strip is installed.

26. The current diverter strip of claim 19 wherein said dielectric is a fluoropolymer.

27. The current strip of claim 19 wherein said dielectric is a fiberglass laminate impregnated with an epoxy resin.

28. The current diverter strip of claim 19 wherein said substrate is a fiberglass laminate impregnated with an epoxy.

29. The current diverter strip of claim 19 wherein said substrate is a polyimide material.

30. A method of forming a current diverter strip, comprising the steps of:
    providing a plurality of conductive segments separated by gaps along a desired path to divert a current across an object;
    providing an insulator in said gaps and along said plurality of conductive segments; and
    providing a dielectric along said conductive segments, thereby positioning said conductive segments between said dielectric and said object;
    said plurality of conductive segments, said insulator and said dielectric arragaed to inhibit said current from traveling through and between said plurality of conductive segments when an ionized path is being created and said current is diverted along said ionized path.

31. The method of claim 30, wherein said step of providing a dielectric provides a substantially planar dielectric.

32. The method of claim 30, wherein said step of providing a plurality of conductive segments includes said desired path along a blade of a wind turbine.

33. The method of claim 30, wherein said step of providing a plurality of conductive segments includes said desired path along an aerospace vehicle.

34. The method of claim 30, wherein said step of providing a plurality of conductive segments includes said desired path along a radome.

35. A transient voltage suppressor current diverter strip adapted to create an ionized path to guide a current associated with said transient voltage, comprising:
   a first electrode and a second electrode;
   a plurality of conductive segments located between said first electrode and said second electrode and separated by reduced-conductivity gaps, said reduced-conductivity gaps adapted to ionize air along said path upon application of an electric field associated with said current; and
   a dielectric located along a surface of said plurality of conductive segments, adapted to inhibit said current from traveling through and between said plurality of conductive segments during creation and existence of;
   wherein applying said transient voltage across said first electrode and said second electrode results in dissipation of said transient voltage along said path.

36. A current diverter strip adapted to create an ionized path to guide a current, comprising:
   a plurality of conductive segments separated by reduced-conductivity gaps; and
   a dielectric covering said plurality of conductive segments;
   said plurality of conductive segments, said reduced-conductivity saps and said dielectric arranged to inhibit said current from traveling through and between said plurality of conductive segments during creation and existence of said ionized path.

37. A current diverter strip adapted to create an ionized path to guide a current, comprising:
   a plurality of graphite conductive segments separated by reduced-conductivity gaps; and
   a fluoropolymer dielectric covering said plurality of conductive segments along an outside surface of the current diverter strip.

38. The current diverter strip of claim 37, wherein said reduced-conductivity gaps, said fluoropolymer dielectric and said plurality of graphite conductive segments are arranged to inhibit said current from traveling through said plurality of graphite conductive segments.

* * * * *

UNITED STATES PATENT AND TRADEMARK OFFICE
CERTIFICATE OF CORRECTION

| | |
|---|---|
| PATENT NO. | : 7,120,004 B2 |
| APPLICATION NO. | : 10/919860 |
| DATED | : October 10, 2006 |
| INVENTOR(S) | : Allen L. Hall |

Page 1 of 1

It is certified that error appears in the above-identified patent and that said Letters Patent is hereby corrected as shown below:

Please correct Column 12, Line 7 which currently reads as follows:

"ductivity saps and said dielectric arranged to inhibit"

So that it reads as follows:

-- ductivity gaps and said dielectric arranged to inhibit--

Signed and Sealed this

Tenth Day of April, 2007

JON W. DUDAS
*Director of the United States Patent and Trademark Office*